INVENTORS
GEORGE Q. HERRICK
ARDEN H. FREDRICK
& JOHN H. GREIG
BY
Busser, Smith & Harding
ATTORNEYS INVENTORS
GEORGE Q. HERRICK
ARDEN H. FREDRICK
& JOHN H. GREIG
BY Buaser, Smith & Harding
ATTORNEYS INVENTORS
GEORGE Q. HERRICK
ARDEN H. FREDRICK
& JOHN H. GREIG
BY
Buckhorn, Smith & Harding
ATTORNEYS United States Patent Office 3,110,891
Patented Nov. 12, 1963

3,110,891

SECURITY FENCE ALARM SYSTEM

George Q. Herrick, Scarsdale, Arden H. Fredrick, Carmel, and John H. Greig, New York, N.Y., assignors, by mesne assignments, to Thompson Ramo Wooldridge Inc., Euclid, Ohio, a corporation of Ohio
Filed June 15, 1960, Ser. No. 36,441
7 Claims. (Cl. 340—258)

This invention relates to an electrical security fence, which term is used in a broad sense to include electrical arrays which, if surrounding an area, may be considered effectively as a "fence," though it may be used in interiors of buildings to detect intruders in rooms or other areas, and may be used for underwater barriers, or the like. Numerous suggestions have been made for security barriers of electrical types for the detection of intruders, but these have had various drawbacks. In many cases, they have been susceptible to penetration by the setting up of counter-fields preventing the giving of the desired signals indicative of intrusion. Others have been susceptible to actual physical manipulation rendering them ineffective. Another drawback has been that they have been susceptible to being triggered by rain or snow.

Furthermore, most such installations have required either laborious or expert construction and have, therefore, not been susceptible to rapid installation and dismantlement.

It is the general object of the present invention to provide a security fence which is not subject to these disadvantages. In accordance with the present invention a fence may be provided merely by the spaced location of pole-like members placed in the ground by unskilled personnel and interconnected by cables which require no special handling and may be extended on the surface of the ground, the fence being of such type that any attempt to tamper with the cables will be detected.

The fence, furthermore, is open from a material standpoint so that authorized personnel or vehicles may pass therethrough upon disablement of the fence by mere manipulation of a switch.

Further, in accordance with the invention, the field of detection is confined, though the field extends in three dimensions, so that it is not susceptible to the causing of false alarms even by persons or objects moving fairly closely thereto but not attempting to penetrate the field.

The arrangement is quite insensitive to conductive conditions of the ground (due to rain, for example) or to more or less uniform accumulation of snow.

In brief, in accordance with the invention a polyphase alternating field is established and sensitive means are provided responding to unbalance of such field. Provision is made for detecting even extremely slow attempts at penetration of the field.

The foregoing general objects of the invention, as well as other objects relating to details of construction of the elements of the system will become apparent from the following description read in conjunction with the accompanying drawings, in which.

Figure 1:
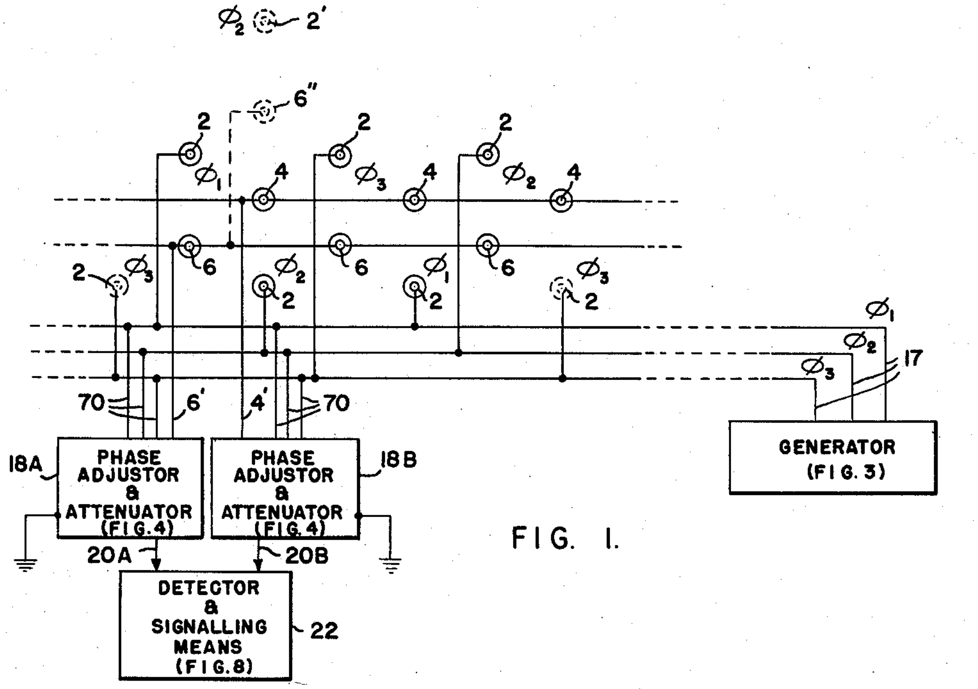
FIGURE 1 is a diagram indicating the layout of field producing and detecting elements together with their associated apparatus.

Reference may first be made to FIGURE 1, the upper portion of which illustrated a typical layout, viewed in plan, of upright conductors providing the fence array. Exciting conductors 2 are arranged at the corners of equilateral triangles, the sides of which may typically be of the order of 8 to 20 feet, though it has been found that this space is not critical, and between these limits there is little change in sensitivity. As will be evident from FIGURE 1, the triangles delimiting the array may be arranged in a linear side by side sequence to provide a linear fence, with necessary distortions to follow a curved line. The conductors 2 need not be accurately set in equidistant fashion, although it is desirable to approximate such condition for purposes of ready balancing. The array may be doubled as indicated by the conductor 2′, and such conductors may form another set of equilateral or approximately equilateral triangles. In fact, as will be evident repetition of conductors at the vertices of a typical array of triangles may cover completely a large area to provide a maze of field producing conductors which could not be penetrated even by the most sophisticated and elaborate counter system. It will also be evident that by building up triangles of the array, right angle or other bends may be made in the fence.

It will be seen that there is one general characteristic involved, namely that, indicated phase of a three phase supply by $\phi_1$, $\phi_2$, and $\phi_3$, each triangular array has three different phases at its corners.

With each triangular array there is a detecting conductor of one of the groups 4 and 6. The arrangement is such that, considering any two triangular arrays which are adjacent with a common side, a conductor 4 is in one and a conductor 6 in the other. This situation may also be viewed from the standpoint that a detecting conductor 6 is in each triangular array in which the clockwise sequence of phases is 1, 2, 3 and a detecting conductor 4 is in each triangular array in which the counterclockwise sequence of phases is 1, 2, 3. The conductor 4 are connected together, and the same is true of the conductors 6, giving rise to the two connections 6′ and 4′. 6″ indicates the detecting element of the group 6 which lies in the triangular array including the field producing conductor 2′. The layout of complex arrangements will be evident from the foregoing.

Figures 2, 3:
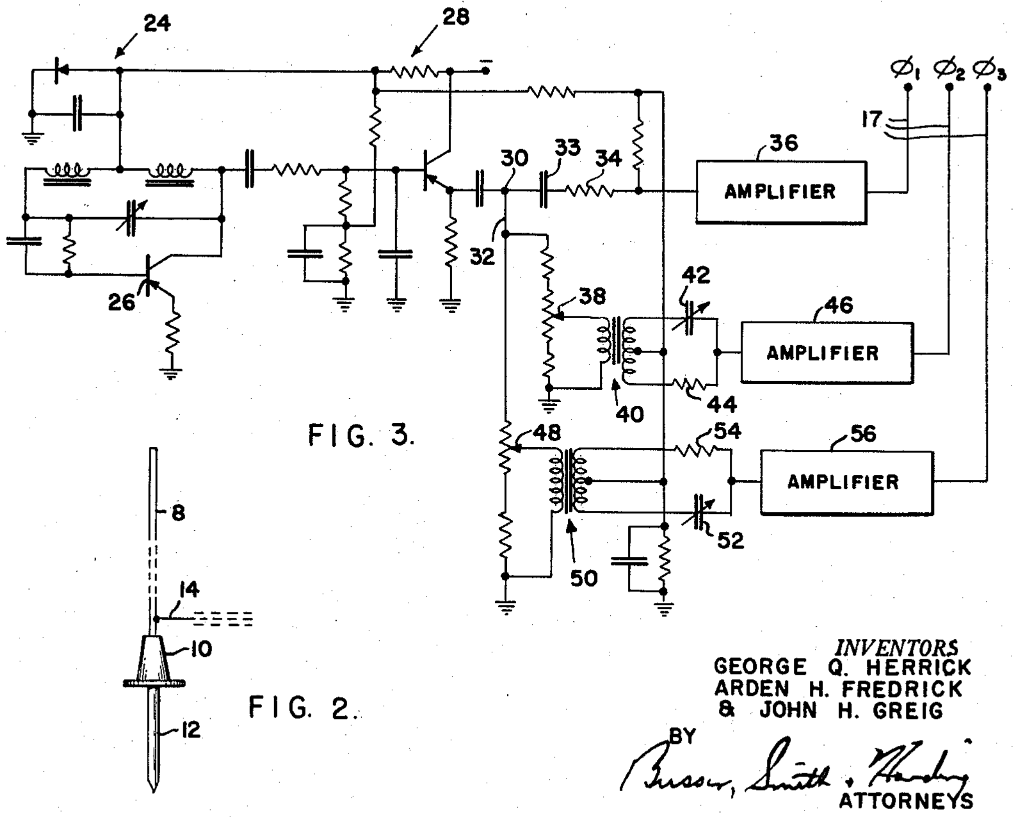
FIGURE 2 is a diagrammatic elevation illustrating a preferred physical form of elements used.
FIGURE 3 is a wiring diagram illustrating a three-phase generator used for excitation.
Figure 4:
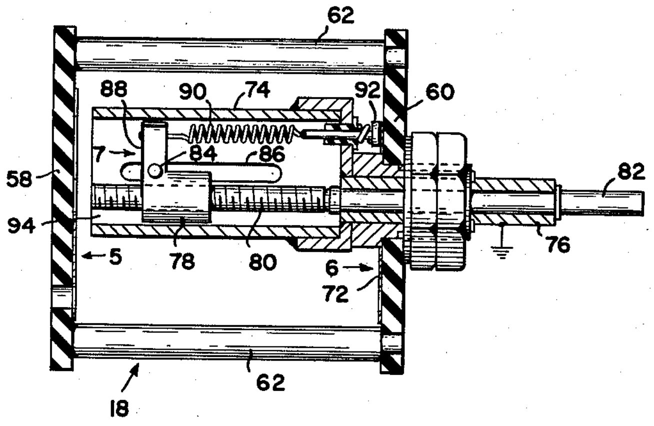
FIGURE 4 is a vertical section taken through an element constituting a phase adjustor and attenuator.
Figure 5:
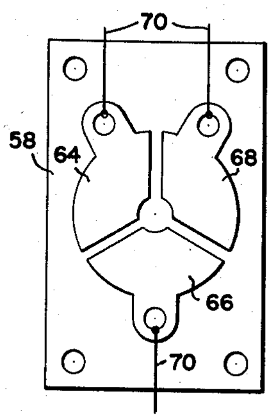
FIGURE 5 is an elevation of one end plate, viewed in the direction indicated by the arrow 5 in FIGURE 4.

Both the field producing and detecting conductors are desirably in the form of a conducting wire or tube 8 as shown in FIGURE 2 supported by an insulating base 10 which is provided with a ground-penetrating spike 12 to hold it in position. Connections are made to the conductors 8 by the inner conductors of coaxial cables indicated at 14, though it is not essential that these cables should be of coaxial form. Desirably the conductors 8 should be sufficiently rigid to avoid swaging in the wind, but might otherwise be mechanically relatively weak to provide safety by being readily bent or broken in case, for example, the fence is used about an air field where possible engagement by landing gear of planes could be disasterous if high rigidity or strength of the conductors was involved. The height of the conductor 8 is quite arbitrary. To prevent penetration by personnel a height of 6 to 10 feet is generally ample if the spacing is sufficient to prevent vaulting.

A three phase generator 16 (detailed in FIGURE 3) supplies current through the conductors 17 of cables such as 14 to the upright conductors 2 to provide the fields, the penetration of which is to be detected. The conductors designated 4 and 6 are respectively connected through the cable conductors 4′ and 6′ to elements 18B and 18A which are illustrated in FIGURES 4 to 7, inclusive. The elements 18A and 18B constitute phase adjustors and attenuators for injecting adjustable phase signals into the connections 4′ and 6′. From these there extend the conductors 20A and 20B feedign detector and signalling means 22 illustrated in FIGURE 8.

Referring, first, to FIGURE 3 which shows the electrical circuit of the generator 16, there is provided a transistorized Hartley oscillator 24 which may be of conventional type including the transistor 26. Since this is conventional it need not be detailed. For purpose of consistency of description it may be assumed that the oscillator generates a ten kilocycle output, though this frequency is not at all critical. Preferably a relatively low frequency of this order is used rather than a higher frequency to reduce the extent of the radiation field so as to avoid sensitivity of the fence to moving personnel or objects at substantial distances from the fence, the desire being to provide a sensitive field confined approximately to the physical bounds of the fence assembly. Radiation is not of particular importance in connection with the fence, the effects being primarily dependent on the electrical field configuration between the conductors and the ground.

The oscillator 24 feeds a conventional amplifier 28 which has its output terminal at 30, this terminal feeding the several phase-determining networks from a common conductor 32. The amplifier 28 is of a follower type constituting a buffer. The first phase is provided by the simple arrangement of capacitor 33 and resistor 34 and delivers its output to a conventional transistor amplifier 36. The second phase determining arrangement comprises the adjustable potentiometer 38 feeding the transformer 40 which, in turn, feeds the phase adjusting arrangement of adjustable capacitor 42 and resistor 44. The output of this phase adjustor is delivered through the amplifier 46 to the second phase line. The third phase is provided from the adjustable potentiometer 48 to the transformer 50 which feeds the phase adjustor arrangement of variable capacitor 52 and resistor 54. This, in turn, provides the third phase through amplifier 56. Once the adjustments of the phases are made, the generator requires no further adjustment. The arrangement is such that the phases are balanced in amplitude and adjusted at least approximately to 120° phase relationship. Symmetry of the phases is not absolutely essential, but is desirable to secure optimum results if the layout of the conductors 2, 4 and 6 is symmetrical as already indicated. As will appear, final adjustments are made in the detecting circuits.

It may be here noted that the precise nature of the low-radiation electromagnetic fields and its action on the detector elements 4 and 6 need not be detailed, and is not fully discussed, because it will be evident that if a completely symmetrical set of arrays was used, having an equal number of detector elements, and if a true ground plane existed, and if the phases were spaced by exactly 120°, the output between lines 4′ and 6′ would be zero. Starting with this, it can be easily seen that if such conditions are approximated but there is asymmetry by reason of ground irregularities, uneven spacings of elements 2, 4 and 6, curvature or bends in the array, unequal numbers of detector elements 4 and 6 (i.e. of triangular arrays), or the like, non-zero signals between the lines 4′ and 6′ may be transformed to zero signals between 20A and 20B by phase shift and attenuation adjustments at 18A and 18B. Once such adjustments are made it will then be seen that any introduction of another asymmetry, by an intruder, will produce a non-zero output.

Reference may now be made to FIGURES 4 to 7, inclusive, which show the mechanical construction of each of the elements 18A and 18B, and which also make clear the electrical configuration involved.

Insulating plates 58 and 60 are connected to provide a frame through the use of rods 62. The insulating plate 58 is formed from copper-clad Bakelite or the like, from which copper is removed to leave the separated conducting segments 64, 66 and 68, each subtending approximately 120°. The plates are connected respectively by the conductors 70 to the three phases of the generator 16.

Figure 6:
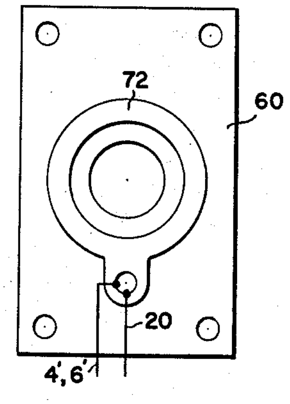
FIGURE 6 is a similar elevation of the opposite end plate viewed in the direction of the arrows 6 in FIGURE 4.
Figure 7:
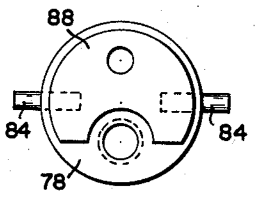
FIGURE 7 is an elevation of a movable member viewed in the direction of the arrow 7 in FIGURE 4.

The plate 60, also of copper-clad Bakelite or the equivalent, provides an annular conducting ring 72 connected to the conductors 20A and 20B, shown in FIGURE 6 as 20. This ring is also connected to one of the respective conductors 4′ or 6′ of FIGURE 1.

A brass tube 74 is carried by a tubular shaft 76 mounted in a bushing in the plate 60 and electrically connected to ground. Within the tube 74 there is provided the carrier 78 of insulating material, such as Bakelite, which is provided with a tapped opening receiving the screw 80 formed as an extension of the shaft 82. Both shafts 76 and 82 are provided with adjusting knobs (not shown). The member 78 is provided with pins 84 arranged to slide in slots 86 in the tube 74 to prevent turning of 78 with respect to the tube but to provide rotation with the tube while permitting sliding due to adjustment of screw 80 relative to the tube. The member 78 is clad with copper as indicated at 88 which is etched away to provide a plate 88 having the outline indicated in FIGURE 7, i.e. clear of the screw 80 and also of the periphery of the member 78 which has a sliding fit within the tube 74. A conductor 90 connects the plate 88 with a pin 92 which is spring biased toward the right as viewed in FIGURE 4 to engage the annular conductor 72, being mounted in an insulating bushing. The conductor 90 is in the form of a spring coil to take care of movements of the member 78 lengthwise of the tube 74. The inductance provided by this coil is not of consequence, the coil being used merely to provide for mechanical movement.

The element just described, which is duplicated as indicated in FIGURE 1, provides both phase adjustment and attenuation of signals injected into the connections 4′ and 6′. While, from one point of view they may be regarded as injecting additive phase adjusted signals, they may also be regarded, effectively, as changing phase and attenuation of the signal originating at the detectors 4 and 6. In fact, phase adjustors and attenuators may be inserted in the lines 4′ and 6′ with equivalent results and independently of the three phase supply. Phase adjustment is effected by the rotation of the tube 74 and the plate 88 relative to the segments 64, 66 and 68, noting that the plate 88 is asymmetric with respect to the axis of rotation. At the same time the plate 88 provides a piston attenuator with adjustment of attenuation being effected by movement of the plate 88 axially through adjustment of the screw 80. As will be evident, adjustments may be made in the elements 18A and 18B to balance the system to secure an ultimate minimum (approximately zero) output taking care of residual asymmetrical conditions consisting in the fence configurations, and occurring due to such matters as irregularity of the earth surface, deviations of dimensions from symmetry and the like, as already noted.

Figure 8:
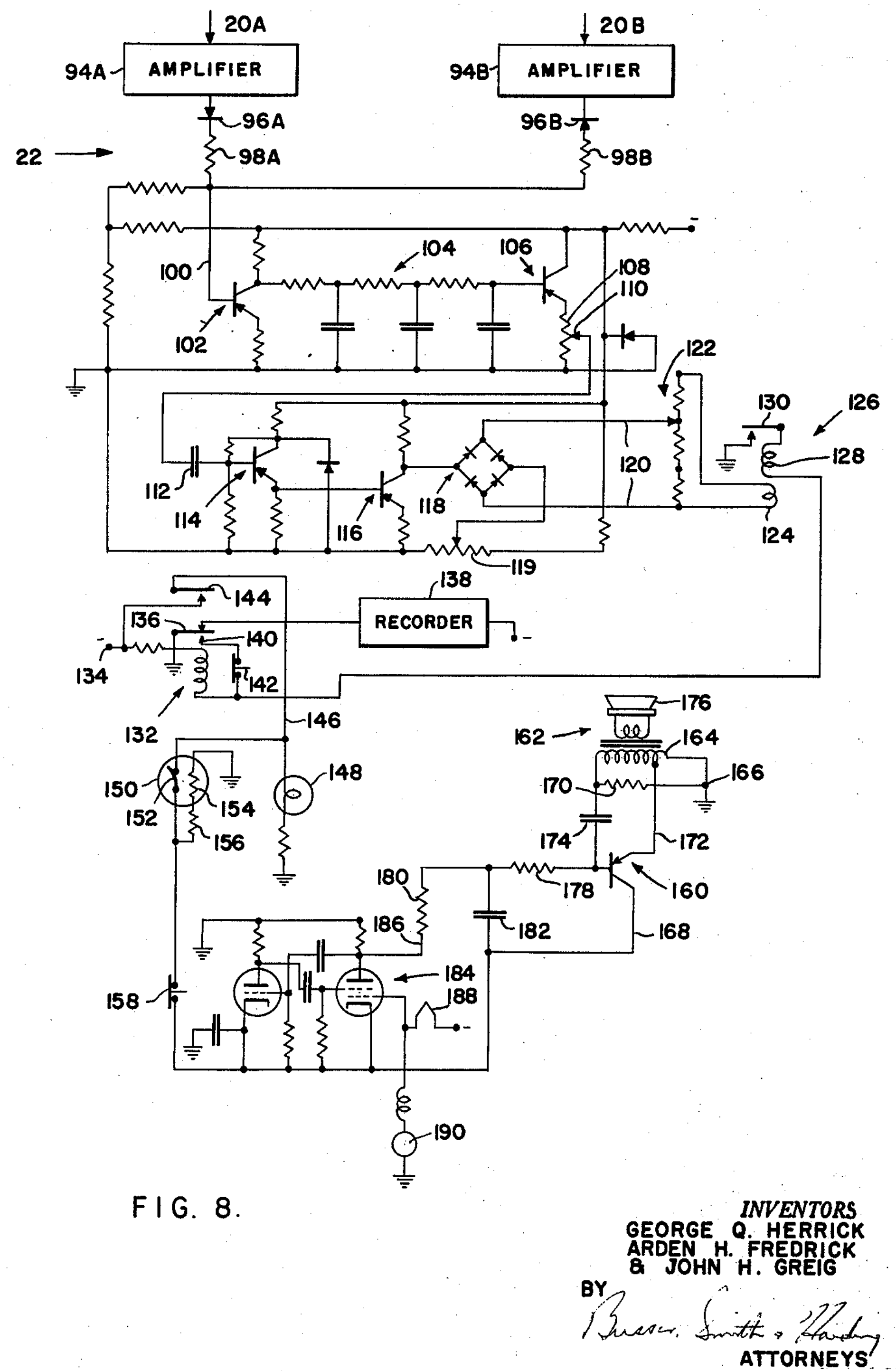
FIGURE 8 is a wiring diagram showing detector and signalling means.

Reference may now be made to the assembly constituting the detector and signalling means 22 illustrated in detail in FIGURE 8. The connections 20A and 20B are made to the inputs of conventional transistor amplifiers of the type having high input impedance and high gain. The input stage of each of these amplifiers is desirably tuned to the frequency of the generator.

The outputs of the amplifiers are delivered to the oppositely disposed rectifiers 96A and 96B which feed adding resistors 98A and 98B to provide a summed input at 100 to a transistor amplifying stage 102. (It will be evident that the phase adjustors and attenuators 18A and 18B will take care of the possibly different amplifications and phase shifts in amplifiers 94A and 94B and in crystals 96A and 96B in addition to the other matters already described; what is actually desired is a normally zero signal at 100.) The output from amplifier 102 is fed to the low pass filter 104 comprising resistors and capacitors in conventional fashion so that a direct (though variable) output is provided to the transistor follower stage 106 having variable gain control provided by adjustment of the contact 110 of the potentiometer 108 in the emitter circuit of this transistor.

The low pass filter is chosen to remove the ripple of the exciting frequency and high speed transients such as static; but so as to pass such lower speed transients such sa would represent the intrusion of a running man or a thrown object.

The output from the gain control contact is delivered through capacitor 112 to provide a differentiated output to the base of transistor 114 associated with resistors as illustrated to provide a circuit of large time constant (typically having a time constant of the order of 2,000 seconds) there being used a capacitor 112 of high capacity value (e.g. 50 microfarads). The output from the transistor 114 acting as a follower, is delivered to the amplifier stage comprising the transistor 116 from which an output is fed to the diode bridge 118 associated with a zero adjustment potentiometer 119.

The bridge output is delivered through connections 120 to a range adjuster 122 comprising a series of resistors provided with connecting taps, the series of resistors being connected across the winding 124 of a sensitive relay 126. It should be noted that the bridge 118 provides an output which is of the same polarity whether the signal provided by the differentiator is positive or negative.

In the foregoing description of elements no reference has been made to the various biasing corrections which are conventional and which include Zener diodes for the maintenance of proper potentials.

The relay 126 is provided with a second winding 128 and with a normally open contact at 130. When sufficient signal current appears in the winding 124, the contact at 130 is closed and then is held closed by reason of the circuit which may be traced from the negative voltage supply terminal 134 through the winding of a relay 132 and then through the winding 128 and contact 130 to ground. This insures that a holding action (normally only momentary) exists whenever even a short transient current of sufficient value flows through the winding 124. (The windings 124 and 128 are, of course, in mutually aiding relationship.) Because of the series interposition of the winding 132 in the circuit just mentioned, this winding is energized and the movable contact 136 of the relay is moved downwardly to engage the fixed contact 140 to complete a circuit which includes the normally closed pushbutton switch 142. The relay 132 is then held energized by the circuit which may be traced from terminal 134 through the relay coil and through the pushbutton switch 142 and contacts 140 and 136 to ground. As will be evident, when this occurs, both ends of the winding 128 of relay 126 are grounded so that the relay may open if current flow through winding 124 has terminated. The entire arrangement is such that once a signal is received by winding 124, the main relay 132 remains energized until the pushbutton switch 142 is manually opened.

Desirably a recorder 138 is provided to record the occurrence of any event reperesenting penetration of the fence, and for this purpose the recorder 138 will normally remain energized by reason of its connection between a negative suply terminal and to ground through the back contact of relay 132 and its movable contact 136. It will be noted that by reason of this arrangement the recorder 138 has its circuit opened by a penetration event but also opened if there should be a power failure at the negative supply terminal. While, for simplicity of diagramming, different supply terminals are illustrated, they are, in fact, connected to a common supply connected to the recorder so that any failure is signalled and recorded.

Energization of the relays 132 results in closure of the normally opened contact at 144 and this operates the signal devices.

The fixed contact at 144 is connected to the negative supply terminal at 134, and the movable contact is connected at 146 to the signal lamp 148 to light the latter when the relay is energized. Additionally, there is provided a thermal relay 150 which may conveniently have a cycle of the order of three minutes, during most of which period its bimetallic contact element 152 is closed. The usual heater for opening the relay is indicated at 154 and a current limiting resistor is provided externally at 156. The operating circuit may be traced from 146 through the contact element 152 and resistors 156 and 154 to ground.

Connected to the lower terminal of the relay is a normally closed manually operable switch 158, and through this switch power connections are provided to a transistorized blocking oscillator including the power transistor 160 associated with an audio transformer 162. The primary 164 of this transformer has its right hand terminal connected to ground at 166. The negative supply connections running from the relay 150 connect to the collector of transistor 160 at 168. A resistor 170 is connected across the primary 164 of the transformer and a tap of this primary is connected at 172 to the emitter of the transistor 160. The base of this transistor is connected through capacitor 174 to the left hand terminal of the transformer primary. The arrangement just described provides a blocking oscillator producing pulses fed through the secondary of transformer 162 to a speaker 176. Constants may be so chosen as to give a high pitched siren signal of great intensity from the speaker.

The foregoing operation would be true if the potential at the base of transistor 160 was constant. However, it is additionally desirable to provide undulation of frequency, and for this purpose the potential of the base of the transistor is varied at a suitable rate by connection through resistor 178 to multivibrator 184. The undulations may occur at repeated periods of, for example, one to two seconds, and by varying the potential of the transistor base the frequency may be varied through a range as desired such as, for example, from 300 to 1,000 cycles per second. Actually the output is rich in harmonics accounting for the piercing tone which is desirable. The multivibrator 184 is conventional and comprises the triode and tetrode illustrated which may be contained in a single envelope, as in the tube 12AL8. The output is delivered at 186 through resistors 180 and 178, with provision of a bypassing capacitor 174 which keeps the blocking oscillator from feeding back signals which would interfere with the independence of operation of the multivibrator. For cooling the power transistor there may be conveniently supplied a motor-driven blower 190. The control grid of the tetrode assembly may conveniently have bias applied by connection between the heater and blower motor. It will be evident that various meters or recorders may be incorporated in the circuit to give either indications or records of operation. Since these may be applied in various obvious fashions they will not be described in detail.

The overall operation will now be apparent. Under normal conditions the apparatus is set up desirably with approximate symmetry of the vertical conductors since this makes balancing easier and results in maximum sensitivity. Residual aspects of asymmetry are taken care of by adjustment of the elements 18A and 18B to result in a minimizing of the signal which is delivered at 100 to the transistor 102.

Any disturbance of the field at any part thereof will result in an increase of the signal at 100 and the direct signal thus provided even if slowly changed by the intrusion will result in an output through the differentiating circuit and the rectifying brdge to energize the relay 126 and thus initiate a warning signal which, as indicated, is audible and/or visible. The circuit is particularly adapted to the detection of very slow changes in the field such as might result from an attempt of an intruder to crawl therethrough even at such a low rate as one foot per minute. Nevertheless there will be detected even high speed intrusion by a running man or a thrown object. Due to the three phase electrical characteristic of the field with which is associated a three dimensional characteristic of the field in spae it is practically impossble to provde any bucking field which could prevent the occurrence of an output due to intrusion. This aspect would, of course, be true of a polyphase system in which the phases were greater than three or even in a two phase system with spatial distributions. However, the three phase system is most practical and affords as much protection as would be given by increase in the number of phases. It lends itself, furthermore, to simple extension horizontally by the possibility of adding, in effect, additional substantially equilateral triangular arrays of exciting elements.

It will be noted that all of the indicated polyphase systems give rise to a field rotating in space, which rotating field is extremely difficult, if not impossible, to modify, consistently with intrusion, so as to maintain unchanged the input to the detecting means.

The system, furthermore, requires no special protection against cutting of the exciting or detecting cables in view of the fact that it is impossible from a practical standpoint to cut all supply phases simultaneously or both of the detecting connections 4' and 6' simultaneously if the cables are spaced. This leads to a physically simple arrangement in which the various cables may be merely stretched out on the ground.

A high degree of insensitivity to rain or snow is also afforded. It is true that a sudden surge of water through the fence or close thereto might produce an asymmetry which would give rise to a warning signal; but the very slow rate of change of conductivity of the earth with a rain storm or of physical contour by deposition of snow would be so slow that no spurious signal would be given, the change being at a very slow rate as not to be susceptible to simulation by even the slowest movement of an intruder.

It will be evident that the principles of the invention may be applied to underwater protection since capacitive and/or conductive fields could be produced underwater by similar arrays of conductors which might or might not, as desired, be insulated from the water.

Furthermore, the invention may be applied to the protection of cables in which, within the exterior insulation there may be incorporated lengthwise extending conductors spaced approximately 120° about the axis and providing a three phase field with respect to which a central conductor may be associated for pickup purposes. Any attempt to cut such a cable would involve a sequential cutting of the phases resulting in an output signal.

Other uses of the invention will be apparent to those skilled in the art, and the invention is not to be regarded as limited except as required by the following claims.

What is claimed is:

1. Intrusion signalling means comprising a source of three phase excitation, a group of associated conductors assembled approximately at the apices of at least one equilateral triangle and connected to the three phases of said supply to provide a rotating three phase field, a pickup element located approximately at the center of said equilateral triangle, means electrically connected to said element providing under normal conditions a predetermined output from said pickup element due to said three phase field, and means operable by the last mentioned means to provide a signal of deviation of said output from its predetermined value.

2. Means according to claim 1 in which said conductors are in the form of upright members insulated from the earth.

3. Means according to claim 2 in which said pickup element is in the form of an upright member insulated from the earth.

4. Means according to claim 2 including means effecting phase adjustment and attenuation in said means connected to said pickup element.

5. Means according to claim 1 including means effecting phase adjustment and attenuation in said means connected to said pickup element.

6. Intrusion signalling means comprising a source of three phase excitation, a group of associated conductors assembled approximately at the apices of a group of equilateral triangles arranged base to base and connected to the three phases of said supply to provide a rotating three phase field, each of said triangles having at its apices such conductors connected respectively to the three phases of the supply, a pickup element located approximately at the center of each of said equilateral triangles, means electrically connected to said elements providing under normal conditions a predetermined output from said pickup elements due to said three phase field, and means operable by the last mentioned means to provide a signal of deviation of said output from its predetermined value.

7. Intrusion signalling means comprising a source of polyphase excitation, a group of associated conductors connected to the phases of said supply and providing a rotating polyphase field, at least one pickup element in said field, means electrically connected to said element and providing under normal conditions a predetermined output from said pickup element due to said polyphase field, and means operable by the last mentioned means to provide a signal of deviation of said output from its predetermined value, said means connected to said element comprising, in succession, rectifying means, a low pass filter, and means blocking direct current but having a large time constant to transmit to said operable means slowly varying signals.

References Cited in the file of this patent

UNITED STATES PATENTS

| | | |
|---|---|---|
| 2,424,677 | Brownlee | July 24, 1947 |
| 2,545,325 | Weimer | Mar. 13, 1951 |